3,766,107
EMULSIONS FOR TREATING ASPHALTS AND ASPHALT STRUCTURES AND METHODS OF EMPLOYING THE SAME IN THE TREATMENT OF ASPHALTS AND ASPHALT STRUCTURES
Fritz S. Rostler, Oakland, and Richard M. White, Contra Costa County, Calif., assignors to Phillips Petroleum Company, Bartlesville, Okla.
No Drawing. Filed July 19, 1971, Ser. No. 164,084
Int. Cl. C08c 7/02, 11/68; C08d 9/06
U.S. Cl. 260—17.4 BB                29 Claims

ABSTRACT OF THE DISCLOSURE

This invention relates to an improvement in the formulation of emulsions for treating of asphalt pavements and other asphalt-bound structures, said emulsions employing saponin as part of the surfactant employed in said emulsions.

---

In the Pat. No. 3,577,250 and copending application Ser. No. 142,067, filed May 10, 1971, one of us has described the use of oil emulsions containing elastomers to produce improved roads and other asphalt-containing structures, after they are formed. The elastomer was included in the oil phase and the emulsion was applied by spreading over the surfaces to be treated.

These emulsions have been formed by employing cationic surfactants and have been found useful for various kinds of asphalts. The rate of penetration of the emulsion into the asphalt aggregate structures especially where the porosity is low has been found to depend upon the nature of the asphalt employed. This is also true in the case of conventional asphalt emulsions, whether they be emulsions of penetration grade asphalt or cut-back asphalt.

Asphalts which produce pavements and other structures where the rate of penetration in surface treatment of such structures is low include asphalts which are hard to wet. Examples of such asphalts are those which contain paraffin wax and are known in the art as waxy asphalts.

The characteristic which distinguishes waxy asphalts from non-waxy asphalts is the presence of wax as established by observance of crystals of solid wax in the "Saturated hydrocarbons" (paraffins) fraction separated by ASTM Method D2006. Such asphalts are not as easily wetted by water as are the non-waxy asphalts and this is true of emulsions containing the conventional cationic emulsifiers or anionic or non-ionic emulsifiers. For the above reasons, such asphalts are herewith named "hard-to-wet asphalts."

We have now found that the rate of penetration and uniformity of penetration of the emulsions of petroleum fractions which are not volatile under ordinary atmospheric conditions (70° F., 760 mm. Hg pressure) when applied to asphalt structures of said hard-to-wet asphalt, are improved by the use of saponin in the emulsification system. An improved penetration is also achieved when the structures contain non-waxy type asphalts. In practical operations, little is known of the chemical composition of the asphalt which is present in an asphalt structure to be treated. The emulsion formed using the saponin may be used effectively whether the asphalt is free of wax or contains wax in an amount usually present in waxy asphalts employed in asphaltic structures. The emulsions are thus of general applicability and may be used without knowledge of the chemical compositions of the asphalts in the structure to be treated.

For producing the emulsions of this invention these saponins are used together with a cationic surfactant.

Saponins employed in the emulsions of this invention comprise a group of organic compounds, most of which are closely related and their structural configuration established, while the structures of some saponins are not as yet established. This lack of exact chemical definition in terms of structural formulas is typical of many natural organic compounds extracted from natural sources, e.g., plants, but those skilled in the art recognize these products by their generic names and understand their functions and utility on the basis of the disclosure made herein. The principal characteristics of saponins employed in this invention are that they are water and ethanol soluble natural glycosides, consisting either of an aglycone which may be oleanolic acid, quillaic acid, or another sapogenin, and a sugar which may be glucose, galactose, pentose, methylpentose or other sugars, or consisting of an aglycone and a glycoside of a steroid structure having a spiroketal side chain. The saponins are further characterized by being precipitable by cholesterol.

The saponin which we prefer for use in this invention is Quillaia saponin, which has the general formula

a melting point of 207° C. and is a dibasic keto-acid isolated from Quillaia saponaria (soap bark). We have selected Quillaia saponin as a typical product useful for attaining the object of this invention, but other species fitting the generic classification of saponins may also be used.

We prefer to employ these saponins in addition to cationic emulsifiers. Where hereafter in the examples we refer to saponins, it is understood that reference is made to Quillaia saponin.

It is our present preference to employ the saponin as additive to emulsions described in the above patent and patent applications.

We have found, that by using saponin emulsions containing petroleum oil fractions, either free of or containing asphaltenes, with or without added polymers, an improved wetting of waxy asphalts is obtained and improved penetration of an aggregate-asphalt structure, such as roads and other asphalt-containing structures, results. Such emulsions are also useful with non-waxy asphalts and therefore have improved penetration with structures containing either waxy or non-waxy asphalt types.

A great number of cationic surfactants suitable as emulsifiers are available for use in formulating the emulsions. The cationic surfactant should be a good emulsifying agent and provide a lasting positive charge. Small amounts of a nonionic surfactant can also be added to facilitate emulsification and to minimize foaming.

Emulsifiers may be of the class of fatty quaternary ammonium salts, fatty amido-amino-amine salts, e.g., amido-amino-amine acetate, etc., alkyl amino alkylene amines and their salts and include the use of cationic surfactants with nonionic surfactants such as poly(ethoxy) compounds. Various suitable surfactants are described in standard textbooks such as "Encyclopedia of Surface Active Agents" by Sisley and Wood (Chemical Publishing Company, Inc., New York), and "Surface Active Agents and Detergents" by Schwartz, Perry and Birch (Interscience Publishers, New York).

While we do not wish to be bound by any theory as to why saponin produces emulsions which have such improved penetrating properties, we do note that emulsions produced by employing saponin show a smaller angle of contact against a fresh surface of asphalt of various types, both waxy and non-waxy. The following experiment shows that a saponin-containing emulsion has better wetting properties than one without saponin.

EXAMPLE 1

An emulsion prepared according to the following recipe was used as control and base formulation:

TABLE 1

Emulsion No. 1

| | Wt. percent |
|---|---|
| Thermoplastic poly(styrene) - poly(butadiene)-poly(styrene) block copolymer [1] | 9.0 |
| Petroleum oil [2] | 51.0 |
| Oronite dispersant Ni-W [3] | 2.5 |
| Redicote E-1 [4] | 0.5 |
| Hydrochloric acid, 31.5% | 0.3 |
| Saponin [5] | --- |
| Water | 36.7 |

[1] Solprene 406-04, Phillips Petroleum Company.
[2] A solvent extract from the refining of a catalytic recycle oil, 25 cp. at 77° F. (Phillips Petroleum Co. $SO_2$ extract).
[3] Nonionic surfactant, alkylphenol polyethoxy ethanol, Chevron Chemical Co.
[4] Cationic surfactant, fatty amine, Armour Industrial Chemical Co.
[5] Saponin, technical grade, Matheson, Coleman & Bell Div. of Matheson Co.

Emulsion No. 1 above was diluted with one-half volume of water containing saponin referred to in the above table in concentrations of 0.04, 0.2 and 2% or plain water to give diluted emulsions with compositions equivalent to saponin contents of 0.00, 0.02, 0.1 and 1% respectively, based on the emulsion concentrate; single drops of each diluted emulsion were placed on freshly-prepared surfaces of nine paving asphalts, and the angle of contact between the emulsion and the asphalt surface was measured according to ASTM Method D724, as shown below:

TABLE 2

| | Asphalt [1] | | | | | | | | |
|---|---|---|---|---|---|---|---|---|---|
| | V | B | A | C | 56 | 3 | 105 | 91 | 92 |
| | Penetration grade | | | | | | | | |
| | 60-70 | 60-70 | 60-70 | 60-70 | 85-100 | 85-100 | 85-100 | 85-100 | 85-100 |
| Composition [2]: | | | | | | | | | |
| Asphaltenes, percent | 10.9 | 27.8 | 23.6 | 21.0 | 20.3 | 30.7 | 24.3 | 11.6 | 21.3 |
| Nitrogen bases, percent | 41.5 | 26.6 | 14.3 | 20.8 | 12.1 | 16.0 | 21.1 | 36.7 | 33.3 |
| First acidaffins, percent | 14.2 | 21.5 | 21.5 | 17.2 | 21.0 | 20.6 | 20.8 | 17.0 | 17.7 |
| Second acidaffins, percent | 20.7 | 17.8 | 27.9 | 29.9 | 30.8 | 23.7 | 24.4 | 20.9 | 16.6 |
| Paraffins, percent | 12.7 | 6.3 | 12.7 | 11.2 | 15.8 | 9.0 | 9.9 | 13.8 | 11.1 |
| Waxy [1] | No | Yes | Slight | Yes | Slight | No | Yes | No | Yes |
| | Angle of contact, degrees | | | | | | | | |
| Saponin content [3]: | | | | | | | | | |
| 0.00 | 38 | 55 | 38 | 49 | 41 | 36 | 57 | 39 | 63 |
| 0.02 | 35 | 54 | 40 | 49 | 41 | 36 | 56 | 35 | 61 |
| 0.1 | 33 | 40 | 37 | 43 | 39 | 35 | 50 | 32 | 59 |
| 1.0 | 34 | 46 | 37 | 38 | 37 | 35 | 45 | 35 | 53 |

[1] The presence of wax established by observance of crystals in the "saturated hydrocarbons" (paraffins) fraction separated by ASTM Method D2006. These asphalts are identified in the paper by White, Mitten and Skog "Proceedings of Association of Asphalt Paving Technologists" 1970, vol. 39, pages 492-531 and in the paper by Rostler and White, "Proceedings of Association of Asphalt Paving Technologists" 1962, Vol. 31, pages 35 et seq. particularly pages 54-58.
[2] Determined by ASTM Method D2006.
[3] Based on emulsion concentrate.

It will be noted that the addition of the saponin has reduced the angle of contact substantially indicating an improved wetting power.

The following example illustrates the improvement of the rate of penetration of a petroleum oil emulsion into an asphalt concrete structure resulting from the use of saponin.

EXAMPLE 2

Emulsions were prepared having the following compositions:

| Emulsion No. | 2 | 3 | 4 |
|---|---|---|---|
| Petroleum oil,[1] wt. percent | 60.0 | 60.0 | 60.0 |
| Emeen 6680,[2] wt. percent | 0.9 | 0.9 | 0.9 |
| Emnon 6939,[3] wt. percent | 0.9 | 0.9 | 0.9 |
| Saponin, wt. percent | 0.00 | 0.05 | 0.15 |
| Water, wt. percent | 38.2 | 38.15 | 38.05 |

[1] A blend of 75 parts (by weight) of SAE 50 lubricating oil distillate with 25 parts of solvent extract from the refining of a medium-viscosity lubricating oil.
[2] Cationic emulsifier, fatty amido-amine acetate, Emery Industries, Inc.
[3] Nonionic emulsifier, dodecyl phenol polyethoxy ethanol, Emery Industries, Inc.

The above-described emulsions, diluted with one-half volume of water, were applied to Ottawa sand-portland cement-asphalt briquettes prepared as described below. The time for complete penetration of 10 ml. of the diluted emulsions into the briquettes is shown in Table 3.

TABLE 3

| Emulsion No. | 2 | 3 | 4 |
|---|---|---|---|
| Saponin content, percent | 0.00 | 0.05 | 0.15 |
| Time to penetrate briquette made with easy-to-wet asphalt,[1] sec | 87 | 80 | 62 |
| Time to penetrate briquette made with hard-to-wet asphalt,[2] sec | 322 | 226 | 120 |

[1] Asphalt V, Table 2.
[2] Asphalt B, Table 2.

The briquettes referred to above were prepared by mixing at 325° F., 90 parts (by weight) graded Ottawa sand (ASTM Designation C-109), 10 parts portland cement and 7.5 parts paving asphalt, cooling the mixture to ambient temperature, and molding 2.5 inch diameter, 1.6 inch high briquettes with 2.0 inch diameter, 0.318 inch deep reservoir in the top. The portland cement is a part of the aggregate; since it is not mixed with water, it does not bind the mixture into a portland cement concrete.

Where it is desired to introduce an elastomeric polymer, i.e., an elastomer into an asphalt contained in an asphalt structure, according to the methods described in Pat. No. 3,577,250, and in the application, Ser. No. 142,067 filed May 10, 1971, by one of us, an elastomer such as described herein is incorporated into the non-aqueous phase of the emulsion as is described in said patent and application respectively. We now prefer to employ as the emulsifiation system a combination of the saponin with the cationic emulsifier.

The oil when employed is preferably one having an initial boiling point not much below 300° C. at atmospheric pressure, as determined by ASTM test method D86. A small amount of volatile solvent can be added. The preferred oil used is one which is substantially free of asphaltene, and having a viscosity of at least 20 cp. at 77° F. Oils in the range of 50 to about 200 SUS at 210° F. are generally satisfactory. Preferably, the asphaltenes-free oil should be soluble in n-pentane, according to the method described in ASTM Designation D2006. Emulsions with oil phases containing an asphalt may also be improved by addition of saponin.

The oil fraction is preferably substantially free of material boiling below 300° C. at 760 mm. of mercury pressure, i.e. about 160° C. at 10 mm. mercury pressure (ASTM Method D-1160), except when a small amount of solvent has been added.

The oil chosen should be compatible with the added elastomer and the asphalt. Such an oil is here termed a compatible oil as will be more fully described below. The paraffins content of the oil is chosen with this end in view and the permissible content of the paraffins in the oil depends on the composition and the amounts of the elastomer and asphaltenes and on the nature of the oil.

The oil may be a rubber extender oil or a blend of high boiling oils which are compatible with the polymer and the maltenes which is the pentane-soluble fraction of asphalts. The preferred oils are generally of the type defined as ASTM extender oils 101 and 102 in ASTM Designation D2226–63T. These oils are substantially free of asphaltenes. Examples of suitable extenders are Witco Chemical Company products Califlux GP and Califlux 550, Phillips Petroleum Company product Philrich 5, and Shell Oil Company products Dutrex 739 and Dutrex 1786; further identified in Table 4.

TABLE 4

|  | Rubber extender oil ASTM type | Viscosity at 25° C. cp. |
| --- | --- | --- |
| Califlux GP | 101 | 12,000 |
| Califlux 550 | 101 | 750,000 |
| Philrich 5 | 101 | 30,000 |
| Dutrex 739 | 101 | 22,000 |
| Dutrex 1786 | 101 | 28,000 |

The petroleum oils specified in Table 4 are suitable and contain suitable contents of nitrogen bases. These oils preferably contain 5 to about 50% by weight of nitrogen bases as determined by ASTM procedure D2006. The content of paraffins is desirably sufficiently low as not to precipitate the n-pentane insoluble polymers when these are used as additives to the oil or asphalt of the composition.

The petroleum fraction employed in the emulsion may contain normal pentane-soluble polymer such as natural rubber, for example, No. 1 RSS, SBR random copolymer, for example, SBR–1500 and synthetic cis (poly(isoprene), poly(butadiene) or mixtures thereof, etc. These elastomeric polymers form part of the maltenes phase and modify the properties of the asphalt by modifying the maltenes phase thereof as described in the copending patent application, Ser. No. 142,067, filed May 10, 1971.

The natural rubber No. 1 RSS (ribbed smoked sheets) used in some of our experiments was a high-grade, unvulcanized natural rubber as commercially available from dealers of natural rubber under the standard designation of No. 1 ribbed smoked sheets.

The synthetic rubber SBR (styrene-butadiene rubber)–1500 is described in ASTM Designation D–1419–62T. The particular random SBR polymer used in our experiments was Ameripol 1500 from Goodrich Gulf Chemical, Inc., the synthetic cis-poly(isoprene) used was Natsyn 200 from Goodyear Chemical Division and the synthetic trans-poly(isoprene) was Transpip from Polymer Corporation Limited.

These pentane soluble polymers form part of the maltenes component of the treated asphalt when the non-aqueous phase of the emulsion is incorporated into the asphalt by the hereindescribed process.

The amount of the elastomeric polymer to be incorporated into the asphalt can be grouped in three ranges:

(1) By weight of the asphalt, 0.1–2.5% which is the primary range of this invention;
(2) by weight of the asphalt, 2.5–10% which is a permissible range for roads; and
(3) by weight of the asphalt, over 10%, which might be advantageous if special effects are desired, e.g., in tennis court surfaces.

EXAMPLE 3

Emulsions were prepared according to the formulations shown in the following table:

TABLE 5

| Emulsion No. | 1 | 5 | 6 | 7 |
| --- | --- | --- | --- | --- |
| Thermoplastic styrene butadiene block copolymer,[1] wt. percent | 9.0 | 9.0 | 9.0 | 9.0 |
| Petroleum oil,[2] wt. percent | 51.0 | 51.0 | 51.0 | 51.0 |
| Oronite dispersant NI-W,[3] wt. percent | 2.5 | 2.5 | 2.5 | 2.5 |
| Redicote E-1,[4] wt. percent | 0.5 | 0.5 | 0.5 | 0.5 |
| Hydrochlororic acid, 31.5%, wt. percent | 0.3 | 0.3 | 0.3 | 0.3 |
| Saponin,[5] wt. percent | | 0.02 | 0.06 | 0.10 |
| Water, wt. percent | 36.7 | 36.68 | 36.64 | 36.6 |

For footnotes 1–5 and emulsion No. 1, see Table 1.

The above described emulsions, diluted with one-half volume of water, were applied to laboratory-prepared briquettes as described above.

The effect of the saponin on the rate of penetration is shown in the following table.

TABLE 6

| Emulsion No. | 1 | 5 | 6 | 7 |
| --- | --- | --- | --- | --- |
| Saponin content in emulsion, percent | 0.00 | 0.02 | 0.06 | 0.10 |
| Time for 10 ml. to pentrate briquette [1] made with easy-to-wet asphalt, sec | 600 | 45 | 40 | |
| Time for 10 ml. to pentrate briquette [1] made with hard-to-wet asphalt, sec | 2,340 | 250 | 220 | 165 |

[1] Briquettes prepared as described in connection with Example 2.

As set forth in the above identified patent and patent application, the properties of the asphalt treated by the emulsions may be improved by incorporating poly(styrene)-poly(diene)-poly(styrene) block copolymers or other polymers by dissolving them in the non-aqueous phase of the saponin-containing emulsion. The poly(styrene)-poly(butadiene)-poly(styrene) polymers are insoluble in normal pentane and form part of the asphaltenes component of the asphalt into which they become incorporated when said asphalt is treated by the hereindescribed process.

Examples of such types of copolymers generally included within the term "SBS" block copolymers are copolymers having configurations such as are described herein:

When the homopolymer poly(butadiene) has the configuration $(b)_n=B$, and poly(styrene) has the configuration $(s)_n=S$, block copolymer of these homopolymers have the configuration S—B—S or B—S—B or

Thermoplastic block copolymers, illustrated by those employed in the following examples are of the S—B—S or

type, in which the end blocks are the relatively rigid blocks S and the inner block is the elastic chain-like block B. Such polymers are herein referred to as poly(styrene) ended block copolymers.

An informative paper on the influence of structure and composition on properties of block copolymers has been published by Childers and Kraus in "Rubber Chemistry and Technology" 40 (4), 1183–1199 September 1967. Since no claim is made to the polymers per se, and since they have been described in the prior art, it will be sufficient to refer to the above-cited literature and also to U.S. Patents, 2,975,160; 3,113,912; 3,251,905; 3,231,635; 3,239,478; 3,242,038; 3,265,765; 3,299,174; and 3,333,024, which pertain to block copolymers.

Poly(styrene)-poly(butadiene)-poly(styrene) block copolymers, which may be employed in formulating the emulsions of my invention, may be similar to the copolymers which have been described in the above cited patents as having the following characteristics, to wit, conjugated diene blocks of molecular weight between 2,000 and 1,000,000 and the end blocks having molecular weight between 2,000 and 100,000.

Other block copolymers such as poly(styrene)-poly(acrylo-nitrile)-poly(styrene); poly(styrene)-poly(isoprene)-poly(styrene), or other combinations of plastic and elastic polymer blocks may also be used. All of the foregoing poly(styrene)-poly(diene)-poly(styrene) copolymers are poly(styrene) ended elastomers. The end blocks are poly(styrene) blocks and are distinguished from the poly(styrene)-poly(diene) two-block copolymers in which one end block is a poly(diene) block or from other styrene-diene rubbers in which the arrangement of the styrene and diene monomer units are in random orientation. Those skilled in the art will also be able to substitute, for block copolymers, other polymers as long as they fulfill the requirements of the characteristics of the block copolymers.

Examples of the aforesaid poly(styrene)-poly(butadiene)-poly(styrene) block copolymers are given in the following table. The block copolymers in Table 7 have butadiene:styrene ratios of 50:50 to 65:35, but this ratio is not critical, and we have used successfully polymers with a 25:75 ratio.

Other n-pentane insoluble polymers which may be incorporated into the asphaltenes component in place of the poly(styrene) ended block copolymers include for example poly(chloroprene). We may also use mixtures of the foregoing.

tially nonreactive, with the polymer and with the oil and solvents used.

As an aid in the penetration of the emulsions and particularly as an aid to the fusion of the non-aqueous phase of the emulsion, we may employ a volatile solvent as a component of the non-aqueous phase. Suitable solvents are chlorinated hydrocarbons having suitable boiling points and specific gravity to which may be added aromatic hydrocarbons. Mixtures of trichlorethylene and xylene having a specific gravity of from 0.9 to 1.1 and a flash point above about 80° F. are suitable. Asphalt emulsions employing saponin in the emulsion system may be formulated as follows:

| | Weight percent |
|---|---|
| Asphalt, 10–30 penetration grade | About 40 to about 60. |
| Asphalt fluxing agent, when used | Up to about 10. |
| Solvent (aromatic solvent plus chlorinated hydrocarbon, when used) | About 10 to about 40. |
| Cationic surfactants and saponin | About 0.2 to about 3. |
| Water | Balance. |

The asphalt phase of the emulsion may contain one or more of the following: a fluxing or plasticizing agent, the aforesaid polymers, an aromatic solvent and a chlori-

TABLE 7

| Polymer [1] designation | B/S [2] | Percent S [3] | I.V.[4] | MS-4 [5] | Brookfield viscosity [6] | Tensile strength [7] | Elongation [8] |
|---|---|---|---|---|---|---|---|
| CD 821 | 65/35 | 35 | 1.29 | 104 at 240° F | 3,600 | 4,000 | 810 |
| CD 822 | 60/40 | 38 | 1.45 | 70 at 270 °F | 7,800 | 3,350 | 990 |
| CD 823 | 65/35 | 35 | 1.07 | 101 at 240° F | 1,700 | 3,500 | 875 |
| CD 824 | 60/40 | 25 | 1.37 | 94 at 212° F | 12,000 | 2,750 | 975 |
| CD 825 | 50/50 | 45 | 0.92 | 46 at 275° F | 850 | 3,400 | 800 |
| CD 957 | 65/35 | 35 | 1.29 | 104 at 240° F | 2,450 | 4,080 | 740 |
| CD 960 | | 28.8 | 1.89 | | 760 | 2,620 | 1,000 |
| Solprene 406-01 | | | | | 3,700 | 4,250 | 800 |
| Solprene 406-02 | | | | | 2,300 | 4,170 | 775 |
| CD 1252 | | | | 42 at 270° F | 460 | 4,300 | 775 |
| Solprene 406-04 | 60/40 | | | 38.5 at 270° F | 535 | 4,170 | 840 |
| Solprene 406-05 | 60/40 | | | 66 at 270° F | 7,675 | 4,800 | 830 |
| Solprene 406-06 | 60/40 | | | 28 at 270° F | 600 | 3,970 | 840 |
| Solprene 406-08 | 60/40 | | | | 370 | 3,850 | 800 |

[1] Polymers sold by Phillips Petroleum Company.
[2] Butadiene-styrene ratio.
[3] Percent Styrene as block.
[4] Inherent viscosity (for definition, see Journal of Colloid Science I 261–9, May, 1946; reprinted in Rubber Chemistry Tech. XIX (4) 1092–6, (October. 1964).
[5] Mooney viscosity, ASTM Method D-1646.
[6] Brookfield viscosity of a 15% solution in trichlorethylene, cp. at 77° F., using No. 4 spindle.
[7] Tensile strength ASTM Method D-412.
[8] Elongation ASTM Method D-412.

For some uses, as for example, in soil stabilization, or in treatment of soils for traffic, as in roads, the petroleum fraction may be an asphalt which will stiffen the elastomer.

The main characteristic of the added asphalts is that asphalt is amorphous and does not possess the same degree of elastomeric properties of being extensible and retractable. Although not bound by any theory, we believe the asphalt apparently modifies the performance of the elastomer by its stiffening effect at ordinary temperatures and its low viscosity at elevated temperatures. Typical examples of commercial asphalt to be used as stiffening agents are hard asphalts as produced by propane precipitation or other low penetration grade asphalts.

Typical asphalts suitable for use as stiffening agents are shown in Table 8.

TABLE 8

| | Penetration at 77° F. (ASTM Method D5) | Softening point, ° F. (ASTM Method D36) |
|---|---|---|
| Asphalt residuum from steam and vacuum distillation, 10–30 penetration grade | 15 | 145 |
| Paving asphalt, 60–70 penetration grade | 64 | 120 |
| Hard asphalt from solvent de-asphalting process | 1.5 | 213 |
| Do | 3 | 184 |

The particular asphalt which is employed is not critical except that it must be compatible, i.e. miscible, but essennated hydrocarbon solvent such as trichlorethylene in proportions to give a non-aqueous phase having a specific gravity ranging between about 0.9 and 1.1. The trichlorethylene is generally present in the concentrate in an amount sufficient to raise the flash point of the concentrate to a safe value, i.e., above about 80° F., while not increasing the specific gravity of the emulsion base above about 0.9 to 1.1. The weight ratio of volatile aromatic hydrocarbon type solvent to the trichlorethylene may range up to about 5:1 and preferably up to about 4:1 so as to provide a safe flash point while maintaining the specific gravity of the emulsion base between about 0.9 to 1.1.

In forming the concentrate of the asphalt emulsion including an anti-stripping agent is used, all as defined above, the non-aqueous phase is emulsified in suitable proportions with water and the saponin-cationic emulsifier combination to form an emulsion concentrate in which the particle size of the dispersed phase is predominantly less than ten microns, and preferably the particle size distribution of the dispersed phase is over 90% in the range of about 0.5 to about 5 microns and less than about 5% above 10 microns. The weight ratio of non-aqueous phase to water phase may range from about 4:1 to about 1:4. The emulsion concentrate may be acidified to a pH of about 4.5 to 6.5, acetic and hydrochloric acid being preferred for the acidification.

Specific examples of emulsions for the above purposes are as follows:

EXAMPLE 4

The effect of the saponin as an additive to an asphalt emulsion containing a styrene-ended block copolymer is illustrated by the following example. Emulsions were prepared according to the following formula:

TABLE 9

| Emulsion number | 8 | 9 | 10 | 11 | 12 |
|---|---|---|---|---|---|
| Asphalt, 60-70 penetration grade wt. percent | 46.0 | 46.0 | 46.0 | 46.0 | 46.0 |
| Solprene 406-08, wt. percent | 4.0 | 4.0 | 4.0 | 4.0 | 4.0 |
| Xylene, wt. percent | 7.0 | 7.0 | 7.0 | 7.0 | 7.0 |
| Trichloroethylene, wt. percent | 7.0 | 7.0 | 7.0 | 7.0 | 7.0 |
| Oronite NI-W,[1] wt. percent | 1.0 | 1.0 | 1.0 | 1.0 | 1.0 |
| Redicote E-1,[2] wt. percent | 2.0 | 2.0 | 2.0 | 2.0 | 2.0 |
| Hydrochloric acid, 31.5%, wt. percent | 1.25 | 1.25 | 1.25 | 1.25 | 1.25 |
| Saponin, wt. percent | | 0.05 | 0.15 | 0.25 | 0.5 |
| Water, wt. percent | 31.75 | 31.70 | 31.60 | 31.50 | 31.25 |

See footnotes at end of table 1.

The above emulsion, diluted with one-half volume of water, were applied to Ottawa sand-portland cement-asphalt briquettes prepared as specified in Example 2; the time for complete penetration of 10 ml. of the diluted emulsions into briquettes is shown bleow:

TABLE 10

| Emulsion number | 8 | 9 | 10 | 11 | 12 |
|---|---|---|---|---|---|
| Saponin content, percent | 0.00 | 0.05 | 0.15 | 0.25 | 0.50 |
| Time to penetrate briquettes [1] made with easy-to-wet asphalt, min | 4.8 | 3.6 | 5.5 | | |
| Time to penetrate briquettes [1] made with hard-to-wet asphalt, min | 32 | 31 | | 23 | 17 |

[1] Briquettes prepared as described in connection with Example 2.

The combined asphalt and fluxing agent and polymers preferably should have a pentration at 77° F. in the range from about 40 to about 120 and preferably in the range of about 60 to about 100 where peneration grade asphalt is desired.

It is preferred to produce the emulsion with a minimum amount of water, and volatile solvent and to dilute the concentrated emulsion with water before use. The ratio of the elastomer-oil phase or the elastomer-oil-asphalt phase to the water phase in emulsion concentrates may range from about 4:1 to about 1:4. For ease of dilution, it is preferred to employ an emulsion concentrate with about 50% of "solid," i.e., the non-aqueous phase (excluding the volatile solvents when used). Higher concentration of the non-aqueous phase is desirable for economy of shipping, packaging, and storage. The ratios employed are such as to form solutions having viscosities which facilitate producing fine particle size emulsions, i.e., with a particle size of the dispersed phase of predominantly less than 10 microns and prefeerably less than 3 microns. Conventional emulsification equipment may thus be used.

The specific gravity of the oil phase (including the solvent if used) should be close to that of water, for example, about 0.9 to 1.1. After achieving the proper specific gravity for the oil phase, the system is then emulsified in water with saponin and a actionic emulsifier. The emulsion may be acidified to a pH of about 4.5 to 6.5. Acetic acid and hydrochloric acid are preferred acids for use in acidification.

The emulsifier concentration should be kept relatively low so as to prevent spontaneous re-emulsification when the composition, after application and evaporation of the water phase, is rewet as, for example, by rainfall. Preferably, the concentration of emulsifier is about 3% by weight or less of the total emulsion concentrate. We have found that the useful range of saponin concentration in the above oil or asphalt emulsions is from about 0.01 to about 1% by weight of saponin based on the emulsion, and the preferred range is from about 0.02 to about 0.5% by weight of saponin based on the emulsion.

The particle size has been found to be a desirable property of the emulsion in order to obtain good penetration into the soil or asphalt structure. A suitably small particle size is also preferable in producing a tack-free surface of the treated area reasonably soon after application. By observing emulsions of the same composition but having different particle sizes of the dispersed phase under a microscope, it has been found that emulsions which do not penetrate satisfactorily have a preponderant amount of particles in the dispersed phase above 15 microns. Emulsions with particle sizes in the dispersed phase which are predominantly less than 10 microns were found to penetrate readily and to give a non-tacky surface within four hours after application. The dispersed phase of the preferred emulsion has a particle size distribution of over 90% in the range of 0.5 to 5 microns and less than 5% above 10 microns.

The following are specific formulations which are the preferred emulsion when using an elastomer. However, if the presence of an elastomer is not desired, the formulations may be employed using the same ratio of components in producing the non-aqueous phase.

COMPOSITION #1

Percent by weight

| | |
|---|---|
| Elastomer [1] | 4.0 |
| Hard asphalt from solvent de-asphalting process, softening point 100–110° C. | 26.3 |
| Oil [2] | 19.7 |
| Trichlorethylene | 6.8 |
| Xylene | 6.8 |
| Cationic surfactant [3] | 2.0 |
| Saponin | 0.4 |
| Acetic acid (glacial) | 1.0 |
| Water | 33.0 |

[1] Solprene 406–08 (Table 7).
[2] Philrich 5 (Table 4).
[3] Tallow diamine.

COMPOSITION #2

Percent by weight

| | |
|---|---|
| Oil phase: | |
|   Solprene 406–08 | 9.0 |
|   Califlux GP [1] | 51.0 |
| | 60.0 |
| Water phase: | |
|   Cationic surfactant [2] | 0.5 |
|   Nonionic surfactant [2] | 2.5 |
|   Saponin | 0.06 |
|   HCl (31.5%) | 0.3 |
|   Water | 36.64 |
| | 40.00 |

[1] See Table 4.
[2] Tallow diamine.
[3] Oronite NI–W, see Table 1.

COMPOSITION #3

Percent by weight

| | |
|---|---|
| Oil phase: | |
|   Asphalt 1.5 penetration | 30.2 |
|   Extender oil 101 | 15.8 |
|   Solprene 406–08 | 4.0 |
|   Xylene | 6.8 |
|   Trichlorethylene | 6.8 |
|   Anti-stripping agent [1] | 0.4 |
| | 64.0 |
| Water phase: | |
|   Cationic surfactant [2] | 2.0 |
|   Nonionic surfactant [3] | 1.0 |
|   Saponin | 0.1 |
|   HCl (31.5%) | 1.25 |
|   Water | 31.65 |
| | 36.00 |

[1] Redicote 2323, Armour Industrial Chem. Co.
[2] Tallow diamine.
[3] Oronite NI–W, see Table 1.

COMPOSITION #4

| Asphalt phase: | Percent by weight |
|---|---|
| Asphalt, 15 penetration | 50.0 |
| Asphalt fluxing agent | 5.0 |
| Xylene | 8.5 |
| Trichlorethylene | 8.0 |
| | 71.5 |
| Water phase: | |
| Anti-stripping agent [1] | 0.5 |
| Cationic surfactant [2] | 2.0 |
| Saponin | 0.6 |
| Acetic acid (glacial) | 1.0 |
| Water | 24.4 |
| | 28.5 |

[1] Redicote 2323, Armour Industrial Chem. Co.
[2] Redicote E–1, see Table 1.

The combination of an asphalt and an elastomer, i.e., poly(styrene)-ended block copolymer in the systems as is described in the aforesaid application filed May 10, 1971, results in an intermingling of the asphaltene's molecules with the elastomer molecules.

The aforesaid oil based and asphalt based emulsions may be used separately or as mixtures to give a plural component non-aqueous phase composed of an asphalt phase and an oil phase. The emulsions may be compounded from emulsions in the range of 10 parts of oil based emulsion to 90 parts of asphalt based, up to 90 parts of oil based to 10% of asphalt based emulsions, all parts being by weight.

The quantity of elastomer present in the oil or the asphalt forming the non-aqueous phase may be varied depending upon the amount of elastomer to be combined with the asphalt within the treated asphalt pavement. In general, polymer concentrations of about 0.5 to about 25 percent by weight of the non-aqueous phase and preferably 10 to about 25 percent by weight of the non-aqueous phase have been found satisfactory. These elastomers may be all n-pentane soluble or all n-pentane insoluble polymers as described above. However, the polymers may be mixtures of the n-pentane soluble and n-pentene insoluble polymers depending on the properties which are desired to be incorporated into the treated asphalt. The effect of such polymers and mixtures thereof are described in said application Ser. No. 142,067 filed May 10, 1971.

The quantity of water employed in the emulsion can be varied within the scope of our invention, depending upon the treatment to be given a particular asphalt pavement. Thus, for example, an emulsion containing 20–50% by weight of water and 80–50% by weight of the oil phase, including the elastomer dissolved therein may be employed. The emulsion can be applied to asphalt pavement or it can be further diluted with water, e.g., from 0.5 to 4 parts of water per part of emulsion concentrate, prior to its application to the pavement.

As stated previously, in the practice of our method, the emulsion is applied to asphalt-aggregate mixture after it has been laid down to form a surface. The emulsion may be applied by spraying the road using conventional truck sprayers, immediately after the pavement has been laid down while it is still at elevated temperature and while it is cooling. We prefer, however, to apply the emulsion to an asphalt pavement after it has been compacted by steel rollers or even later in the roadbuilding procedure, after the pavement has been compacted by pneumatic rollers and the pavement has cooled down to ambient temperatures. The permeability of the asphalt pavement will, of course, vary depending upon the type and grading of the aggregate and the degree of compaction. The porosity and void content of the asphalt pavement are variables which affect the rate at which the emulsion will penetrate the asphalt pavement and the amount of emulsion accepted by the pavement. The saponin-containing emulsions of our invention penetrate asphalt pavements at a more rapid rate, and deposit the oil phase of said emulsions more uniformly within the pavement structure, than emulsions of similar composition not containing saponin. The improvement is especially pronounced in the case of pavements containing waxy or other hard-to-wet asphalts.

We claim:

1. A method of treating asphalt in an asphalt aggregate structure, said method comprising impregnating said asphalt-aggregate structure by applying to the surface thereof an aqueous emulsion in which the non-aqueous phase is a petroleum fraction; said petroleum fraction containing elastomeric polymers at a concentration in the range from about 0.5% to about 25% by weight of said petroleum fraction, said elastomeric polymer being at least one member selected from the group consisting of (A) pentane soluble polymers selected from the group consisting of natural rubber, styrene-butadiene random co-polymers, synthetic cis poly (isoprene), trans poly (isoprene) and poly (butadiene) or (B) at least one member of pentane insoluble polymers selected from the group consisting of poly (styrene)-poly (diene)-poly (styrene) block co-polymers, and poly (styrene)-poly (acrylonitrile)-poly (styrene) block copolymer and poly (chloroprene) or (C) mixtures thereof; said emulsion containing saponin in the range of 0.01% by weight to about 1% by weight of the emulsion.

2. The method of claim 1 in which the polymer is substantially insoluble in n-pentane.

3. The method of claim 2 in which the polymer is a poly(styrene) - ended, poly(styrene) - poly(diene)-poly (styrene) block copolymer.

4. The method of claim 2 in which the polymer is poly (styrene)-ended, poly(styrene)-poly(butadiene)-poly(styrene) block copolymer or poly(chloroprene).

5. The method of claim 2 in which said petroleum fraction is an oil having an initial boiling point which is not substantially below about 300° C. at 760 mm. Hg, said oil being substantially soluble in n-pentane, or an asphalt or a mixture of said oil and said asphalt.

6. The method of claim 5 in which the polymer is poly (styrene)-ended poly(styrene)-poly(diene)-poly(styrene) block copolymer.

7. The method of claim 5 in which the polymer is poly (styrene)-ended poly(styrene)-poly(butadiene)-poly(styrene) block copolymer or poly(chloroprene).

8. The method of claim 1 in which the polymer is soluble in n-pentane.

9. The method of claim 8 in which the n-pentane soluble polymer is a styrene-butadiene synthetic rubber or poly(butadiene) or natural rubber or synthetic trans-poly (isoprene) or synthetic cis-poly(isoprene) or mixtures of said n-pentane soluble polymers.

10. Method of claim 1 in which said polymer is a mixture of a polymer substantially soluble in n-pentane and a polymer substantially insoluble in n-pentane.

11. The method of claim 10 in which the n-pentane insoluble polymer is a poly(styrene)-ended poly(styrene)-poly(diene) poly(styrene) block copolymer, or mixtures thereof, or poly(chloroprene) or mixtures of poly(styrene)-poly(diene) block copolymers and poly(chloroprene) and said n-pentane soluble polymer is a styrene-butadiene synthetic rubber or natural rubber or poly (butadiene) or synthetic trans-poly(isoprene) or synthetic cis-poly(isoprene) or mixtures of said n-pentane soluble polymers.

12. The method of claim 11 in which the poly(styrene)-ended poly(styrene)-poly(diene)-poly(styrene) block copolymer is poly (styrene)-poly(butadiene)-poly(styrene) block copolymer.

13. An aqueous emulsion in which the non-aqueous phase is a petroleum fraction; said petroleum fraction containing elastomeric polymer at a concentration in the range from about 0.5% to about 25% by weight of said petroleum fraction, said elastomeric polymer being at least one member selected from the group consisting of (A) pentane soluble polymers selected from the group consisting of natural rubber, styrene-butadiene random co-polymers, synthetic cis poly (isoprene), trans poly (isoprene) and poly (butadiene) or (B) at least one member of pentane insoluble polymers selected from the group consisting of poly (styrene)-poly (diene)-poly (styrene) block co-polymers, and poly (styrene)-poly (acrylonitrile)-poly (styrene) block copolymer and poly (chloroprene) or (C) mixtures thereof; said emulsion containing saponin in the range of about 0.01% by weight to about 1% by weight of the emulsion.

14. The emulsion of claim 13 in which the polymer is substantially insoluble in n-pentane.

15. The emulsion of claim 14 in which the polymer is a poly(styrene) - ended, poly(styrene)-poly(diene)-poly(styrene) block copolymer.

16. The emulsion of claim 13 in which the polymer is poly - styrene ended, poly(styrene)-poly(butadiene)-poly(styrene) block copolymer or poly(chloroprene).

17. The emulsion of claim 13 in which said petroleum fraction is an oil having an initial boiling point which is not substantially below about 300° C. at 760 mm. Hg, said oil being substantially soluble in n-pentane, or an asphalt or a mixture of said oil and said asphalt.

18. The emulsion of claim 17 in which the polymer is substantially insoluble in n-pentane.

19. The emulsion of claim 13 in which the polymer is poly(styrene) - ended poly(styrene)-poly(diene)-poly(styrene) block copolymer.

20. The emulsion of claim 18 in which the polymer is poly(styrene) - ended poly(styrene)-poly(butadiene)-poly(styrene) block copolymer, or poly(chloroprene).

21. The emulsion of claim 13 in which the polymer is substantially soluble in n-pentane.

22. The emulsion of claim 21 in which the n-pentane soluble polymer is a styrene-butadiene synthetic rubber or poly(butadiene) or natural rubber or synthetic trans-poly(isoprene) or synthetic cis-poly(isoprene) or mixtures of said n-pentane soluble polymers.

23. The emulsion of claim 17 in which the polymer is substantially soluble in n-pentane.

24. The emulsion of claim 23 in which the polymer is a styrene-butadiene synthetic rubber or natural rubber or poly(butadiene) or synthetic trans-poly(isoprene) or synthetic cis-poly-(isoprene) or mixtures of said n-pentane soluble polymers.

25. The emulsion of claim 13 in which said polymer is a mixture of a polymer substantially soluble in n-pentane and a polymer substantially insoluble in n-pentane.

26. The emulsion of claim 25 in which the n-pentane insoluble polymer is a poly(styrene)-ended, poly(styrene) - poly(diene) - poly(styrene) block copolymer, or mixtures thereof, or poly(chloroprene) or mixtures of poly(styrene)-poly (diene) block copolymers and poly (chloroprene) and said n-pentane soluble polymer is a styrene-butadiene synthetic rubber, or natural rubber or synthetic trans-poly(isoprene) or poly(butadiene) or synthetic cis-poly(isoprene) or mixtures of said n-pentane soluble polymers.

27. The emulsion of claim 26, in which the poly(styrene) - poly(diene)-poly(styrene) block copolymer is a poly(styrene) - poly(butadiene)-poly(styrene) block copolymer.

28. A method of treating asphalt in an asphalt-aggregate structure, said method comprising impregnating said asphalt-aggregate structure by applying to the surface thereof an aqueous emulsion of a petroleum fraction; said emulsion containing saponin in the range of about 0.01% by weight to about 1% by weight of the emulsion.

29. The method of treating claim 28 in which said petroleum fraction is an oil having an initial boiling point which is not substantially below about 300° C. at 760 mm. Hg, said oil being substantially soluble in n-pentane or an asphalt or a mixture of said oil and said asphalt or a cutback asphalt.

References Cited
UNITED STATES PATENTS

| | | | |
|---|---|---|---|
| 3,577,250 | 5/1971 | Rostler | 106—278 |
| 3,404,108 | 10/1968 | Regenstein et al. | 260—29.7 UA |
| 3,345,316 | 10/1967 | Nielsen | 260—28.5 AS |
| 2,537,190 | 1/1951 | Lankau et al. | 260—17.4 BB |

WILLIAM H. SHORT, Primary Examiner

E. WOODBERRY, Assistant Examiner

U.S. Cl. X.R.

117—163; 260—33.6 AQ, 742, 759, 760, 761